United States Patent [19]
Kawasaki

[11] 3,791,739
[45] Feb. 12, 1974

[54] INTERFEROMETER FOR X-Y MEASUREMENT

[75] Inventor: Harumi Kawasaki, Tokyo, Japan

[73] Assignee: Asahi Kogaku Kogyo Kabushiki Kaisha, Tokyo-to, Japan

[22] Filed: Dec. 22, 1971

[21] Appl. No.: 210,964

[30] Foreign Application Priority Data
Dec. 30, 1970 Japan.............................. 45/122567

[52] U.S. Cl. ............................. 356/106 R, 356/110
[51] Int. Cl. ............................................ G01b 9/02
[58] Field of Search....................... 356/106; 350/286

[56] References Cited
UNITED STATES PATENTS
| | | | |
|---|---|---|---|
| 3,377,111 | 4/1968 | Brault | 356/106 |
| 3,622,244 | 11/1971 | Chitayat | 356/106 |
| 2,147,615 | 2/1939 | Barone | 350/286 |

*Primary Examiner*—John K. Corbin
*Assistant Examiner*—Conrad Clark
*Attorney, Agent, or Firm*—Wolder & Gross

[57] ABSTRACT

An interferometer for measuring distances along coordinate axes including a pair of stages each movable in a direction along one of a pair of perpendicular coordinate axes, each carrying a mirror which travels along said axis. Each of said mirrors is respectively in the optical path along said axis of an associated interferometer means, each of the two interferometer means being fed by a common light source, preferably a laser, and means associated with at least one of said interferometer means to introduce corrections for mechanical play in the system and corrections for relative rotation of the states about the intersection of the coordinate axes.

8 Claims, 2 Drawing Figures

3,791,739

PATENTED FEB 12 1974

INTERFEROMETER FOR X-Y MEASUREMENT

BACKGROUND OF THE INVENTION

The present invention relates to a practical interferometer for length measurement utilizing the principle of light wave interference in the measurement or positioning of two-dimensional co-ordinates.

In recent years small-sized and compact interferometers using a laser as a light source have become available. For almost all of them, ideal performance in single-dimensional length measurement of linear distance is claimed. It is, of course, possible to use these interferometers in the measurement of two-dimensional co-ordinates. For example, each of a pair of these conventional interferometers may be associated with each axis of co-ordinates (hereinafter referred to as X-axis or Y-axis) so that length measurement of either of the co-ordinates may be done independently of that of the other. Such a method, however, is relatively expensive as well as inadequate to the accurate reading or positioning of two-dimensional co-ordinates.

In the first place, a co-ordinate shifting mechanism, mounting an object to be measured, is generally not independent, as will be described later with reference to FIG. 1. As a co-ordinate support (therefore, the object to be measured) shifts, for example, in the direction of the X-axis, the optical axis of the interferometer associated with the Y-axis would also shift in the direction of the X-axis, so that, even when an exact value is obtained, at least with respect to either one of the axes of co-ordinates, a correct value with respect to the other cannot be obtained unless there is a compensating optical arrangement or the measurements are processed by calculating means. Furthermore, the addition of such arrangements and calculating means is not only uneconomical but relatively inefficient.

In the second place the Abbe's error due to the zigzag shift (or unwanted play) of the co-ordinate shifting mechanism cannot be adequately compensated for even by the addition of such an optical arrangement. In other words, it is impossible by simple application of the interferometers of single-dimensional type now available to compensate the Abbe's error or to keep the co-ordinates (X, Y) to be measured coincidental with the optical axes of the associated interferometers, respectively.

To overcome this shortcoming, the interferometer of the present invention employs an optical system designed to compensate for the Abbe's error.

Thirdly, in the prior art device, two light sources, such as laser devices, are needed for the two interferometers for length measurement, one being employed for each axis. On the other hand, the interferometer of the present invention is economical in that a single light source is used in common for the interferometric measuring means for both axes.

SUMMARY OF THE INVENTION

It is a principal object of the present invention to provide an improved interferometer for determining values along intersecting axes.

Another object of the present invention is to provide an interferometer for co-ordinate length measurement which is both economical and free from the disadvantages of the prior art as above set forth. More specifically, there is provided in the present invention an interferometer with which a single light source is used in common to both axes and exact values of two dimensional co-ordinates can be obtained simultaneously with respect to both axes by means of an optical arrangement adapted to keep the co-ordinates to be measured coincidental with the optical axis of the interferometer.

DESCRIPTION OF THE PREFERRED EMBODIMENT

Figure 1:
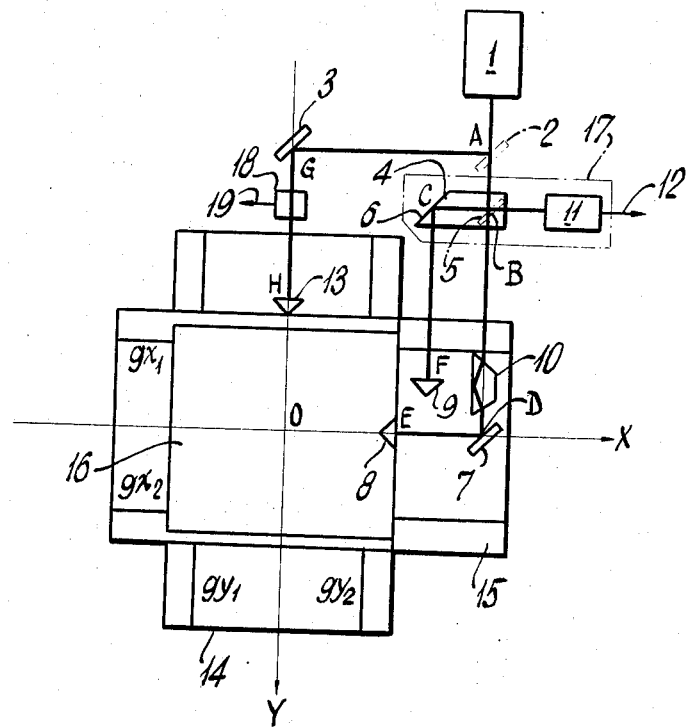
FIG. 1 is a schematic representation of an interferometer for two-dimensional length measurement according to the present invention.

Referring now to the accompanying drawings which illustrate a preferred embodiment of the invention, the improved apparatus includes what follows.

There are provided on the upper surface of a bed 14 a pair of slidable surface guides $gY_1$ and $gY_2$ along which a Y stage 15 travels in the direction of the Y-axis. There are provided on the Y stage another pair of guides $gX_1$ and $gX_2$ normal to said guides $gY_1$ and $gY_2$, along which another stage or co-ordinate support 16 travels in the direction of the X-axis. When an object to be measured is secured on the upper surface of the co-ordinate support 16, any point thereon may freely be displaced by this mechanism on both planes X, Y. A beam coming from a coherent light source 1 is divided by a beam splitter in the form of a half-silvered mirror 2 into two beams of which one is incident on an interferometer 17 associated with the X-axis, and the other is bent by a reflector 3 at an angle of 90° and then enters another interferometer 18 associated with the Y-axis.

The beam incident on the interferometer 17 associated with the X-axis is split by a beam splitter 4 into two beams. The beam which is transmitted by a semi-transparent membranous surface 5 of said beam splitter 4, is guided through a Dove's prism 10 secured to the Y stage 15 to a reflector 7 also secured to the Y stage and bent by this reflector 7 at an angle of 90° following which it then strikes a mirror 8, which is shiftable along the X-axis and secured on the co-ordinate support 16. It is then reflected by mirror 8 and thereafter retraces the same light path back to a point B on the beam splitter 4. The other beam, which is bent by a reflecting surface 6 of said beam splitter 4, is reflected again by an adjustable or movable compensation mirror 9 secured on the Y stage. After reflection from mirror 9 such other beam retraces the same light path back to the point B on the semitransparent surface 5 of the beam splitter 4, where these two beams are merged into one another.

On the point B, both beams form the so-called interference fringe which repeats light-and-dark alternation on a cycle exactly corresponding to a half of the light wave length (hereinafter referred to as λ) as the co-ordinate support 16 shifts. This light-and-dark alternation of the interference fringe is photoelectrically converted by a photoelectric element 11 into a current signal 12 which is, in turn, converted by a pulse circuit into a pulse signal of λ/4 or λ/8 digit. This pulse signal together with a pulse which represents a plus or minus sign depending on the direction in which the coordinate support 16 shifts may be used in a suitable conventional counting circuit (not shown) to count the amount of shift or travel of support 16.

The arrangement of the interferometer 18 associated with the Y-axis is the same as that of the interferometer 17 associated with X-axis except that in the latter a beam splitter 4 and its reflecting surface 6 associated with Y-axis are disposed normal to the beam incident thereupon. As the mirror 13 secured to the co-ordinate support 16 is shifted along the Y-axis an output 19 for pulse counting is obtained in the same manner as previously mentioned in connection with the interferometer 18 associated with the X-axis. The interferometer 18 associated with the Y-axis is simplified in FIG. 1.

An essential feature of this arrangement of interferometers is that measurement is made always on an intersection 0 of the extensions of the optical path ED extended along the X-axis, and the optical path GH extending along the Y axis independently of the position of the coordinate support 16 at the time of measurement. Selection of both optical axes in such a manner has an advantage that, even with a very small amount of rotation of the co-ordinate support 16 around the point 0 due to the zigzag shift the Abbe's error can effectively be reduced.

To compensate for the play in the mechanical system the movable compensation mirror 9 is required in the interferometric optical system associated with the X-axis. Assume, for convenience of explanation, that such movable compensation mirror 9 is absent and a beam splitter 4 is identical to that previously mentioned which is associated with Y-axis. It is also assumed that a Dove's prism 10 is not used.

When the displacement along the X-axis is stopped and the Y stage 15 is moved in the direction of the Y-axis in the state as assumed above, the light path BD extending along the X-axis (which should not shift) may now tend to shift in the direction of the Y-axis. Thus, a suitable means is needed for subjecting a counted value of the output 19 for pulse counting to algebraic subtraction at the later stage of processing of the output 12 for counting. The algebraic substraction means a reversible counting depending on the direction of shift along the Y-axis. As a further disadvantage, the Abbe's error due to a mechanical defect of the shifting mechanism along the Y-axis usually brings about a difference between the variation of GH, the length of the light path along the Y-axis and the variation of BD, the length of the light path along the X-axis, resulting in the failure in the subtracting process.

When a movable compensation mirror 9 is employed, on the other hand, lengths of coherent light paths BD and CF (which may be referred to as sections of the measuring and compensation paths respectively, and the latter as a compensation beam) in the direction of the X-axis offset each other and thereby a variation of the light path along the X-axis caused by a shift in the direction of the Y-axis can be eliminated. Although there may be the Abbe's error which corresponds to the difference between variations of both light paths BD and CF, such an Abbe's error can be controlled to achieve a desired accuracy of the metering system by narrowing the distance between the axes of both light paths. Especially when a laser device is employed as a light source 1, an effective diameter of coherent light beam is as small as a few millimeters. For this reason, the size of optical components, and accordingly, said distance between the axes, may be made extremely small. At this time the movable compensation mirror 9, the mirror 8 shiftable along the X-axis and the mirror 13 shiftable along the Y-axis are of an identical kind in the form of optical systems of the cat's eye type or the corner cube prisms. This is because the characteristic feature of these optical components always assures that the axis of reflected light is in coaxial relationship with the axis of the incident light, independently of the rotation of a very small amount accompanying the shift along both axes.

There are some other methods by which a variation of light path along X-axis caused by a shift in the direction of the Y-axis is eliminated. In one of these methods the interferometer 17 associated with the X-axis is secured to the upper surface of the Y stage 15 so that the optical axis of said interferometer 17 coincides with OD (as described in the specification of U.S.Patent No. 1,143,242). When the coherent light source 1 is fixedly located outside of the Y stage, however, undesirable aberration may occur between optical axes of the light source 1 and the interferometer 17 associated with the X-axis on the Y stage 15 due to the shift of the Y stage 15. Furthermore, theoretically it is desirable to leave the upper surface of the Y stage 15 vacant (without mounting any means on it), for reading or positioning of co-ordinates generally requires that both the co-ordinate support 16 and the Y stage 15 be compact and light in weight so that they may be driven with low torque and low inertia. For this reason, in practice, various components to be placed on the Y stage 15 such as the movable compensation mirror 9 shown in FIG. 1 are of a size smaller than that of the interferometer 17.

Figure 2:
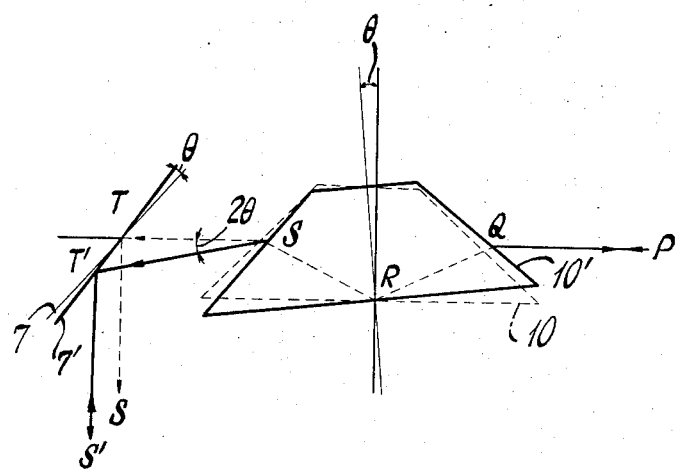
FIG. 2 is a schematic representation of a portion of the optical interferometer illustrated in FIG. 1 which compensates for an error in length measurement incident to the rotation of an object to be measured.

It is desirable to have a Dove's prism 10 in the measuring path BD in order to correct the misalignment of the incident path to and the reflected path from mirror 7 when the optical components mounted on the Y stage 15 rotate by a very small angle due to the zigzag shift incident to the shift of said Y stage 15. Although the mirror 8 shiftable along the X-axis and the movable compensation mirror 9 are not affected by said rotation as previously mentioned, the path DE of light incident upon the mirror 8 shiftable along the X-axis is inclined at an angle of $2\theta$ as the reflector 7 rotates by an angle of $\theta$. As a result, the beam reflected back by the mirror 8 shiftable along the X-axis and the reflector 7 is in parallel with BD, and not in complete alignment with it. The distance between the two such optical paths or axes increases as the light path DE lengthens. To have the two optical axes aligned, a Dove's prism 10 as shown in FIG. 2 is used. On the assumption that the prism 10 and the reflector 7 (as shown by dotted lines in FIG. 2) rotate by an angle of $\theta$ to the positions 7' and 10', respectively, the light PQRST which has entered the Dove's prism 7' in parallel with the base thereof is now inclined at an angle of $2\theta$ when leaving this prism, and this light ST's' leaving the prism 7, after being reflected by the mirror 8 shiftable along the X-axis, retraces the same light path and aligns with the incident light PQ. The prism 10 and reflector 7 may be located sufficiently adjacent to each other such that the aberration TT' of the light path may be reduced to negligible extent. Accordingly, there occurs no aberration of the light beam DB which is guided back to the beam splitter 4 in contrast to the case where the Dove's prism 10 is not employed. The Dove's prism 10 need not be used, of course, when it is possible to restrain to the minimum the zigzag shift of the Y stage 15 by some mechanical means.

An interferometer for length measurement thus arranged in association with X- and Y- axes has following important advantages: first, a single coherent light source can be used in common to both axes; secondly, the coordinates coincide with associated optical axes; thirdly, a variation in the light path length caused by a shift in the direction of either one axis with respect to the other may optically be offset; fourthly, the Abbe's error due to any mechanical defect of the shifting mechanism may be compensated; and further there are only few optical parts to be placed on the shifter mechanism and the shifting mechanism itself may be made compact and light in weight so as to avoid unnecessary troubles in optical adjustment. Moreover, by using a common light source and owing to the third advantage there is provided an economical and highly efficient interferometer for length measurement by which the length measurement may be effected simultaneously with respect to both the X- and the Y-axes without the provision of any particular additional means for compensation of counting. The interferometer for coordinate length measurement of this type has had more and more practical application owing to the recent development of the laser device. One of the methods for making the measurement is the so-called fringe counting method where the pulses of an interference fringe is directly counted, and in another method detection of speed as well as counting of pulses representing the shifting amount are performed by an interferometer using the laser of two wave lengths as a light source on the basis of Doppler beat of the light wave frequency of the rays attendant upon the shift of a movable mirror. The interferometer for length measurement according to the present invention can be applied in either of these methods The interferometer for length measurement according to the invention is useful as a working machine designed for measurement of relatively short distance (200mm × 200mm) with a super-accuracy (with sensitivity in the order of $0.1\mu$), for example, a machine for manufacturing of IC mask in which a photosensitive material is placed on the coordinate support and the IC pattern is exposed by the pattern exposing device located just above the point 0 in FIG. 1 against said photosensitive material. The interferometer of this invention may also be employed as an accurate drafter (photo marking device) as means for controlling numerical values used in light cutting machine.

What is claimed is:

1. A measuring apparatus comprising a stage mounted for movement along mutually perpendicular longitudinal and transverse directions, a first interferometer for measuring the transverse movement of said stage including a first reflector movable in longitudinal and transverse directions with the corresponding movement of said stage and second and third reflectors movable only in a longitudinal direction with the corresponding longitudinal movement of said stage, said first reflector being oriented to reflect a transverse light beam thereon back in a transverse direction, said second reflector being oriented to reflect a longitudinal light beam incident thereon back in a longitudinal direction and said third reflector being in transverse alignment with said first reflector and being oriented to reflect a longitudinal beam incident thereon transversely toward said first reflector, means for producing a first primary light beam, means for splitting said primary light beam into measuring and reference beams and longitudinally directing them toward said second and third reflectors, and first detector means for combining and detecting said measuring beam reflected from said first and third reflectors and said reference beam reflected from said second reflector, and a second interferometer for measuring the longitudinal movement of said stage and including a fourth reflector movable with the longitudinal movement of said stage and oriented to longitudinally reflect a longitudinal incident beam, means for producing a second primary light beam and splitting said second beam into measuring and reference portions and directing said measuring portion longitudinally toward said fourth reflector and second detector means for combining and detecting said measuring portion of said beam reflected from said fourth reflector and said reference portion of said second primary beam.

2. The apparatus of claim 1 including optical means located in the path of said compensating beam for maintaining constant the direction of said beam independent of the angular displacement of said third reflector.

3. A measuring apparatus comprising a stage mounted for movement along mutually perpendicular longitudinal and transverse directions, a first interferometer for measuring the transverse movement of said stage including a first reflector movable in longitudinal and transverse directions with the corresponding movement of said stage and second and third reflectors movable only in a longitudinal direction with the corresponding longitudinal movement of said stage, said first reflector being oriented to reflect a transverse light beam thereon back in a transverse direction, said second reflector being oriented to reflect a longitudinal light beam incident thereon back in a longitudinal direction and said third reflector being in transverse alignment with said first reflector and being oriented to reflect a longitudinal beam incident thereon transversely toward said first reflector, means for producing a first primary light beam, means for splitting said primary light beam into measuring and reference beams and longitudinally directing them toward said second and third reflectors, and first detector means for combining and detecting said measuring beam reflected from said first and third reflectors and said reference beam reflected from said second reflector, a second interferometer for measuring the longitudinal movement of said stage and including a fourth reflector movable with the longitudinal movement of said stage and oriented to longitudinally relfect a longitudinal incident beam, means for producing a second primary light beam and splitting said second beam into measuring and reference portions and directing said measuring portion thereof longitudinally toward said fourth reflector and second detector means for combining and detecting said measuring portion of said beam reflected from said fourth reflector and said reference portion of said second primary beam, and a Dove prism located in the longitudinal path of said reference beam incident on said third reflector.

4. The apparatus of claim 3 whereon said light beams are formed of coherent light.

5. The apparatus of claim 3 comprising a light source for producing a main beam and means for dividing said main beam into said first and second primary beams.

6. The apparatus of claim 5 including a base member, a carriage mounted on said base and restricted to movement thereon in a longitudinal direction, said stage being mounted on said carriage and being restricted to movement thereon in a transverse direction, said first reflector being mounted on said carriage and said second, third, and fourth reflectors being mounted on said carriage.

7. The apparatus of claim 6 wherein said light source, said main beam dividing means and said detector means are mounted on said base.

8. The apparatus of claim 3 wherein said first and second reflectors are the corner prism type.

* * * * *